United States Patent Office 3,003,788
Patented Oct. 10, 1961

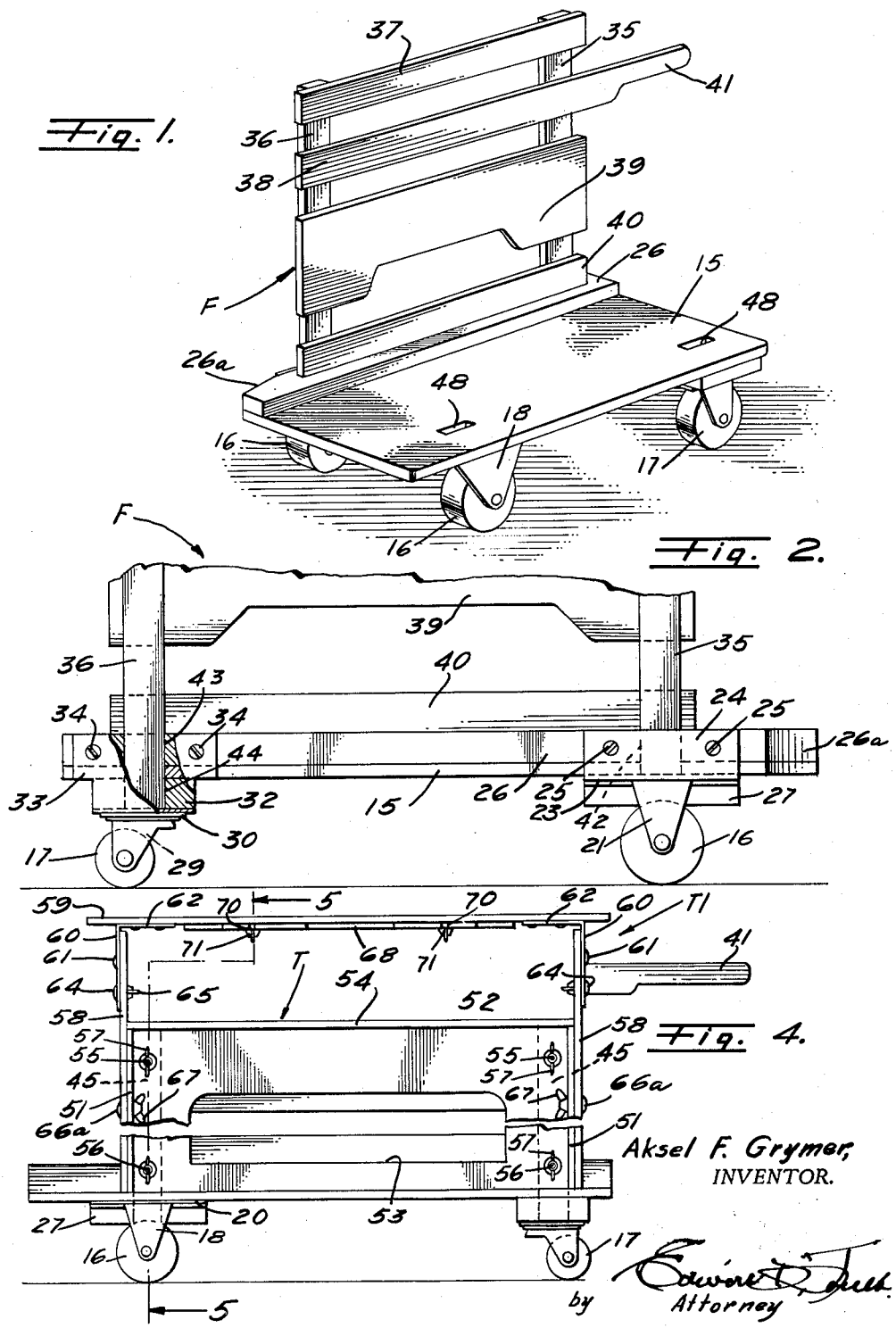

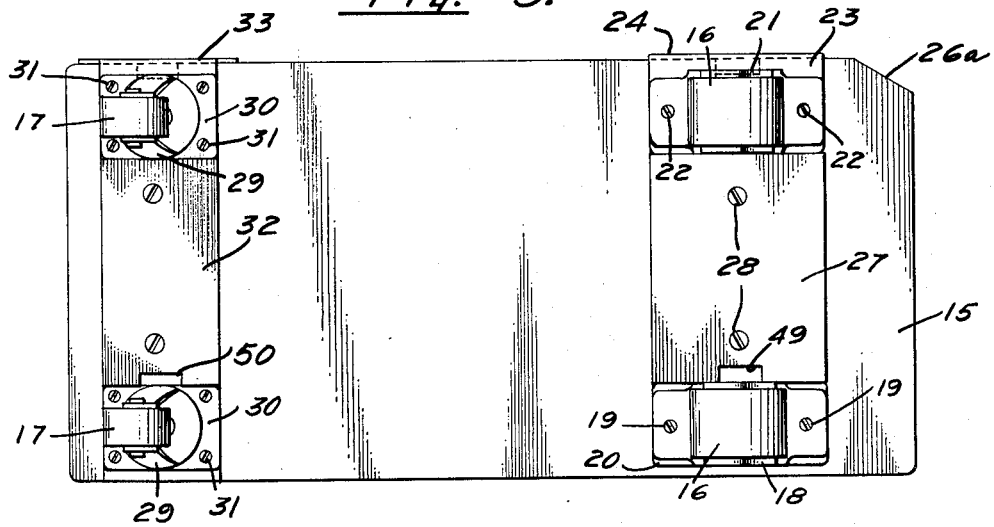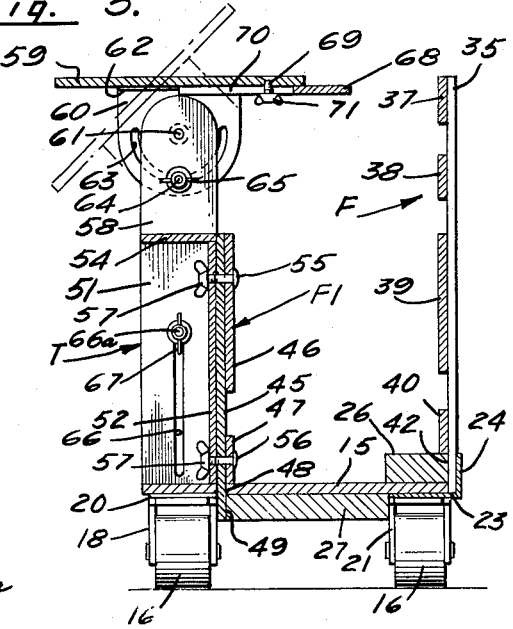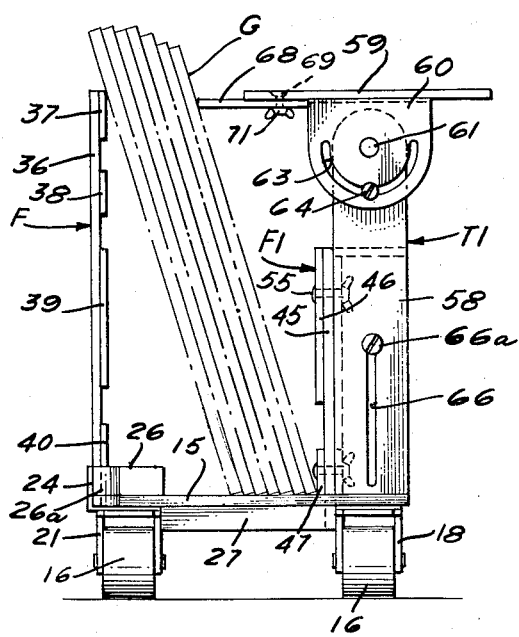

3,003,788
GLAZIER'S TRUCK
Aksel F. Grymer, 940 S. Figueroa St.,
Los Angeles 15, Calif.
Filed Jan. 13, 1959, Ser. No. 786,543
9 Claims. (Cl. 280—179)

My invention relates to trucks of the dolly type, and it has for a purpose the provision of a glazier's truck designed for transporting plates of glass for use in windows, doors, and partitions, to the required points in a building under construction or otherwise, for installation, and in such manner as to minimize the possibility of breakage of the glass during transit.

It is also a purpose of my invention to provide a glazier's truck which embodies a platform on which two side frames are supported in vertical position thereon and in parallel spaced relationship so as to coact in supporting therebetween a plurality of glass plates in inclined position on the platform. These frames are detachable from the platform to facilitate storage or shipment of the truck as a whole.

Another purpose of my invention is the provision of a glazier's truck in which on one of the side frames, is supported for vertical adjustment thereon, a primary table that provides a drafting board as well as a support for plates of glass when cutting the same to fit a particular window or door in which the glass is to be installed, and which coacts with the other side frame to support glass plates in an inclined position on the truck platform. This primary table is reversible on the respective side frame to increase or decrease the distance between the two to accommodate therebetween a lesser or greater number of glass plates and properly support the same on the platform.

A further purpose of my invention is the provision of a glazier's truck in which a secondary table is detachably mounted on the primary table and is adjustable vertically thereon, this secondary table providing the same advantages as the primary table but, in addition, having a top which is adjustable about a horizontal axis to position it at various angles thereon so as to coact with the other side frame for holding glass plates in any number in inclined position on the truck platform.

I will describe only one form of glazier's truck embodying my invention and will then point out the novel features thereof in claims.

In the accompanying drawings:

FIG. 1 is a view showing in perspective one form of glazier's truck embodying my invention, with only one of the side frames thereon.

FIG. 2 is a fragmentary side elevational view of the truck parts shown in FIG. 1.

FIG. 3 is a bottom plan view of the truck.

FIG. 4 is a side elevational view of the complete truck foreshortened vertically.

FIG. 5 is a vertical sectional view taken on the line 5—5 of FIG. 4.

FIG. 6 is a front elevational view of the complete truck.

Referring more particularly to the drawings, my invention in its present embodiment comprises a rectangular platform 15 preferably made of wood, and supported for rolling movement by a pair of wheels or rollers 16 located at the forward end of the platform, and a pair of rear wheels or casters 17 which are swivelly connected to the platform to afford steering of the truck as a whole in its movement over a floor.

As best shown in FIG. 3, one of the rollers 16 is mounted in a metal bracket or hanger 18 secured by screws 19 to a metal plate 20 through which the screws extend for securing the plate to the underside of the platform 15.

The other one of the wheels 16 is likewise mounted in a metal bracket or hanger 21 secured by screws 22 to the horizontal part 23 of a metal frame at the underside of the platform 15. This metal frame has a vertical part 24 (see FIG. 5) secured by screws 25 to the outer edge of a wooden beam 26 which is secured to the top side of the platform at one longitudinal edge thereof as clearly shown in FIG. 1.

The forward end of the beam 26 and the corresponding corner of the platform 15 are bevelled as indicated at 26a. This is for the purpose of facilitating the truck user opening a hinged door to pass the truck through the doorway, since by moving the truck forwardly so as to cause the bevel 26a to first abut the door, the truck can be used to swing the door to open position and without damage to the door.

Also, as best shown in FIG. 3 a wooden cross member or bolster 27 is secured by screws 28 to the underside of the platform 15 and is of such a length as to abut the confronting sides of the brackets 18 and 21 and thus reinforce the same.

Also, as best shown in FIG. 3, the caster wheels 17 are each mounted in a metal bracket 29 rotatably mounted on a metal plate 30 secured by screws 31 to the underside of a wooden cross member or bolster 32. One of the plates 30 has an integral and vertically projecting extension 33 which is secured by screws 34 to the outer side of the beam 26. It will be noted that the caster wheels 17 are smaller than the wheels 16, and thus the bolster 32 is provided to position the brackets 29 at a lower level than the brackets 18 so that the wheels 17 support the platform at the same level as the front wheels 16. The bolster 32 also serves to reinforce the platform transversely at this point.

Vertically mounted on the beam 26 is a side frame, preferably constructed of wood, and designated generally at F. This frame is made up of two legs 35 and 36, secured in parallel spaced relationship by members 37, 38, 39 and 40. The member 38 is greater in length than the other members so that the rear end thereof extends from the leg 35 to provide a handle 41 which is adapted to be gripped in manually moving the truck.

The lower end of the leg 35 is received in a recess 42 in the outer edge of the beam 26, this recess being closed at its outer side by the frame part 24, the lower end of the leg reposing on the frame part 23, as best shown in FIGS. 2 and 5. The lower end of the leg 36 is received in a recess 43 formed in the outer edge of the beam 26 which is spanned by the extension 33.

It will be noted that the leg 36 is longer than the leg 35 so that it can extend downwardly into a recess 44 formed in the bolster 32 and to rest on the plate 30. As illustrated in FIG. 1, the frame F as mounted on the beam 26 by the legs 35 and 36, the member 40 is in abutting relation to the beam 26.

The truck of my invention also includes another side frame, preferably made of wood, and indicated generally at F1. This frame comprises a pair of vertical legs 45 secured in parallel spaced relationship by an upper side member 46 which is cut away as shown in FIG. 4 to lighten the frame, and a rail 47 beneath the member.

The frame F1 is supported in vertical position on the platform 15 and in spaced parallelism to the frame F by the provision of slots 48 in the platform and slots 49 and 50 in the bolsters 27 and 32 respectively. Downward movement of the legs 45 in the slots 48 is limited by the lower edge of the rail 47 abutting the platform 15.

As the side frames F and F1 are mounted on the platform 15 they are naturally removable therefrom by withdrawing the legs from the respective slots, and thus they may be detached from the platform to facilitate storage and packing for shipment. Since these side frames are mounted on the platform in spaced parallel relationship they provide therebetween a space on the platform on which plates of glass G, shown in broken lines in FIG. 6, may be supported in the manner illustrated so that their upper end portions rest against the side frame F and their lower ends against the rail 47 of the frame F1. In this manner the plates G can be readily transported from place to place in a building with minimum possibility of breakage.

My truck also embodies a wooden primary table, indicated generally at T, and designed for the purpose of providing a support for a glass plate in the cutting of the same to a particular dimension for installation in a particular window or door frame. This table comprises a pair of end members or legs 51 fixed in spaced parallel relationship by a wall 52 which may be formed with an opening 53 to lighten the same. Fixed on the upper ends of the legs 51 and the upper edge of the wall 52 is a top 54 coextensive in length with the wall.

The table T may be secured to the inner or outer side of the frame F1 so as to be supported on the platform 15, through the provision of an upper pair of bolts 55 extending through the wall 52, the legs 45 and the member 46, and a lower pair of bolts 56 likewise extending through the legs 45 and through the rail 47. All of these bolts are provided with wing nuts 57 so that by adjustment thereof the member 52 can be securely clamped to the frame F1 and the table thus held in fixed position on the platform 15.

The table T can be clamped to the frame F1 either at the outer side of the latter as shown, or to the inner side thereof. To clamp the table to the inner side of the frame, it is only necessary to remove and reverse the bolts in their positions from the positions shown. When the table is at the inner side of the frame it reduces the distance between the frames F and F1 so that a lesser number of glass plates G can be supported in inclined position on the platform.

The truck of my invention also includes a wooden supplemental table, indicated generally at T1, designed for the same purpose as the primary table T, that is to provide a support for a glass plate to cut the same to a particular dimension, but at a greater height than is permitted by the table T since it is mounted on the latter for vertical adjustment so that its top can be positioned at various elevations above the top.

The table T1 comprises a pair of legs 58 and a top 59 spanning the legs connected thereto by metal brackets 60 pivoted on the upper ends of the legs as at 61. These brackets have horizontal extensions 62 secured to the underside of the top 59, and they are formed with arcuate slots 63 concentric of the pivots 61 and through which extend bolts 64 having wing nuts 65 for clamping the brackets to the bolts so as to secure the former in adjusted position about the pivots 61 and to, in turn, secure the top 59 at various angles of adjustment about the pivots. The purpose of this adjustment of the top 59 is, should the top be used as a drafting board at times necessary in glazing, it can be adjusted to any desirable angle for that purpose.

The table T1 is mounted on the table T for vertical adjustment by forming vertically extending slots 66 in the legs 58, and extending bolts 66a through the slots and the legs 45, and mounting wing nuts 67 on the bolts so that by adjustment thereof the bolts can be caused to clamp the legs 45 and 58 together in a manner to secure the table T1 in vertical adjusted position on the table T.

The table top 59 is provided on its inner longitudinal edge with an extension plate 68 adjustable transversely thereon by bolts 69 extending through the top and across slots 70 in the plate with wing nuts 71 mounted on the bolts for adjustment to clamp the plate to the top and, through the slots, allowing transverse adjustment of the plate on the top.

The purpose for which the adjustable plate 68 is designed is to increase the overall width of the top 59 so that when it occupies the horizontal position shown in FIG. 6, for example, the plate can be adjusted to cause its inner edge to engage and hold the glass plates G in inclined position against the frame F, and thus to minimize the possibility of breakage of the plates during movement of the truck from place to place.

Although I have herein shown and described only one form of glazier's truck embodying my invention, it is to be understood that various changes and modifications may be made herein without departing from the spirit of my invention and the spirit and scope of the appended claims.

What I claim is:

1. A glazier's truck, including: a mobile platform of elongated form; a side frame secured to and extending upwardly from one side of said platform; a second frame secured to and extending upwardly from the other side of said platform in parallel spaced relation to the first-mentioned side frame so that plates of glass can be positioned edgewise on said platform between said frames and inclined against said side frame; a table detachably secured to one side of said second frame; and a second table secured to the first-mentioned table and having a top adjustable about a horizontal axis to occupy various angular positions so that one edge of said top can be variously spaced from said side frame to coact with the latter in holding glass plates between said frames and against movement relative to the frames and on said platform.

2. A glazier's truck, including: a mobile platform of elongated form; a side frame detachably secured to and extending upwardly from one side of said platform; a second frame detachably secured to and extending upwardly from the other side of said platform in parallel spaced relation to the first-mentioned side frame so that plates of glass can be positioned edgewise on said platform between said frames and inclined against said side frame; a table detachably secured to one side of said second frame; and a second table having legs and a top; means affording vertical adjustment of said legs on the first-mentioned table; and means affording angular adjustment of said top on said legs so that one edge of said extension can be variously spaced from said side frame to coact with the latter in holding glass plates between said frames and against movement relative to the frames and on said platform.

3. A glazier's truck, including: a mobile platform of elongated form; a side frame secured to and extending upwardly from one side of said platform; a second frame secured to and extending upwardly from the other side of said platform in parallel spaced relation to the first-mentioned side frame so that plates of glass can be positioned edgewise on said platform between said frames and inclined against said side frame; a table detachably secured to one side of said second frame; and a second table having legs and a top; means affording vertical adjustment of said legs on the first-mentioned table; and means affording angular adjustment of said top on said legs, said top having an extension adjustable thereon to occupy variously extended positions in a plane paralleling that of said top to variously space the extension from the side frame so as to coact with the latter in holding glass plates inclined between said frames and against movement relative to the frames and on said platform.

4. A glazier's truck as embodied in claim 3, wherein said extension is of plate form, and provided with slots extending transversely thereof; bolts secured in said top and extending through said slots; and nuts on the bolts engageable with said plate.

5. A glazier's truck, including: a mobile platform of elongated form, said platform having openings therein spaced along the length thereof at one side thereof; a first side frame having legs receiving in said opening for supporting the frame in vertical position on said platform; said platform also being formed with slots spaced along the length thereof and laterally with respect to said opening; and a second side frame having legs received in said slots for supporting the frame in vertical position on said platform and in spaced parallel relation to said first side frame whereby, a plate of glass can be supported in inclined position between said side frames and on said platform; a table supported on said platform at one side of said second side frame having means for securing said table to said second side frame; and a second table having a top and a pair of legs arranged at the opposite ends of said first table and having slots extending longitudinally of said legs; nuts and bolts extending through said slot for clamping said legs adjustably to the ends of said first mentioned table, said slots affording vertical adjustment of said legs on said first mentioned table to vary the elevation of said top.

6. A glazier's truck as embodied in claim 5 wherein an extension is provided for said top comprising a plate having slots therein, and bolts secured to said top and extending through the last-mentioned slots for securing said plate in adjusted position transversely on said top.

7. A hand truck for transporting plates of glass, including: a mobile platform; a first side frame secured in perpendicular position at one side of said platform; a second side frame secured in perpendicular position adjacent the other side of said platform and in parallel spaced relation to the first side frame so that plates of glass as supported edgewise on said platform can be inclined against the first side frame; and a table mounted on the second side frame and including means for adjusting said table vertically, said table having a top extensible transversely of said platform with its inner edge acting to hold said plates against the first side frame.

8. A hand truck as defined in claim 7 characterized in the provision of manually adjustable clamping means for clamping said table in different angular positions with respect to the horizontal and with the axis of tilt extending lengthwise of said mobile platform.

9. A hand truck as defined in claim 7 characterized in that the top of said table includes means pivotally connecting the underside thereof to stationary upright support means fixed to said second side frame, and adjustable clamping means interconnecting said upright support and said means on the underside of said table, said table being tiltable through an angle of substantially 180 degrees about an axis extending lengthwise of said mobile platform and being clampable in any desired angular position within a range of approximately 180 degrees.

References Cited in the file of this patent

UNITED STATES PATENTS

| | | |
|---|---|---|
| D. 162,230 | Sasser | Feb. 27, 1951 |
| 400,012 | Shanks | Mar. 19, 1889 |
| 1,144,957 | Andree | June 29, 1915 |
| 1,432,296 | Mosel | Oct. 17, 1922 |
| 1,672,035 | Nutting | June 5, 1928 |
| 1,785,064 | Zeindler | Dec. 16, 1930 |
| 1,892,121 | Williams | Dec. 27, 1932 |
| 1,907,780 | Froelich | May 9, 1933 |
| 2,414,277 | Shepard et al. | Jan. 14, 1947 |
| 2,644,715 | Sammis | July 7, 1953 |
| 2,681,233 | Smith | June 15, 1954 |
| 2,726,913 | Freeman | Dec. 13, 1955 |
| 2,830,825 | Webber et al. | Apr. 15, 1958 |

FOREIGN PATENTS

| | | |
|---|---|---|
| 812,990 | Germany | Sept. 6, 1951 |